United States Patent [19]

Rittman

[11] 4,312,418
[45] Jan. 26, 1982

[54] PIVOTED VALVE AND HOOD FOR LIFT TRUCK

[75] Inventor: Udo Rittman, Muelheim, Fed. Rep. of Germany

[73] Assignee: Clark Equipment Company, Buchanan, Mich.

[21] Appl. No.: 136,013

[22] Filed: Mar. 31, 1980

[51] Int. Cl.³ .............................................. B62D 25/10
[52] U.S. Cl. .............................. 180/68.5; 180/69 C; 180/89.17; 296/190
[58] Field of Search ................ 296/190; 220/259, 254, 220/253, 256; 180/68.5, 89.17, 89.18, 69 R, 69 C; 49/367, 368, 369

[56] References Cited

U.S. PATENT DOCUMENTS

| | | | |
|---|---|---|---|
| 3,275,092 | 9/1966 | Matthews | 180/68.5 |
| 3,583,518 | 6/1971 | Bichel et al. | 180/89.17 X |
| 3,829,121 | 8/1974 | Ahrendt | 180/68.5 X |
| 4,068,409 | 1/1978 | White | 49/367 |
| 4,097,085 | 6/1978 | Nelson | 296/190 |
| 4,238,008 | 12/1980 | Higgins et al. | 180/68.5 X |

FOREIGN PATENT DOCUMENTS 1930786 10/1965 Fed. Rep. of Germany .
717876 11/1954 United Kingdom .
1060310 3/1967 United Kingdom .

*Primary Examiner*—Richard A. Bertsch
*Assistant Examiner*—Michael Mar

[57] ABSTRACT

A lift truck in which a hood on which is mounted an operator's seat normally covers a compartment housing a vehicle drive component, such as a battery. The hood has an opening registrable with a valve block, the hood being pivotable rearwardly of the truck to expose the drive component, the valve block being pivotable forwardly of the drive component compartment when the hood is open so as to enable the drive component to be elevated from the truck without interference from the hood or valve control. The valve block is pivotably mounted on an angle member which extends over a portion of the drive component when in operative position and which may swing forwardly from a pivot located at the lower end of a vertical leg thereof to an inoperative position when the hood is raised.

10 Claims, 3 Drawing Figures

PIVOTED VALVE AND HOOD FOR LIFT TRUCK

BACKGROUND OF THE INVENTION

It has been a problem in the art to which this invention pertains to provide full and open access to the power source compartment of sit-down rider trucks which ordinarily have a hood device to cover the compartment on which is mounted an operator's seat. The hood may be bodily removable from the truck, or have side and/or top panels which pivot outwardly and upwardly, or the hood may be mounted to pivot towards the rear of the truck, for example. Exemplary of prior art hood constructions are assignee's U.S. Pat. Nos. 2,931,452 and 3,687,484.

In addition, control levers for controlling various truck functions, particularly hydraulic functions, have been positioned in various locations on the truck including on top of or adjacent a hood section, on a front instrument panel, or extending forwardly from a location mounted adjacent the rear of the driver's seat, for example.

The problem of access is more critical in electric trucks than in gasoline or diesel powered trucks because the battery must be recharged frequently and desirably is removed from the truck for recharging with fresh batteries installed so that the truck may operate continuously.

SUMMARY

The invention relates to the combination of a rearwardly pivotable hood device of a sit-down rider lift truck and a forwardly pivotable valve means which is registrable with an opening in the hood device when the hood is down, all for the purpose of allowing ready access to the drive component such as the battery of an electric truck, for the deposit and removal thereof in relation thereto without interference from the hood device or valve means. The valve means is itself mounted in a unique manner for forward pivotal movement to a non-interferring location in relation to the drive component.

A primary object of the invention is to provide improved access to drive component compartments, particularly in sit-down rider type lift trucks.

DESCRIPTION OF THE PREFERRED EMBODIMENT

Figure 1:
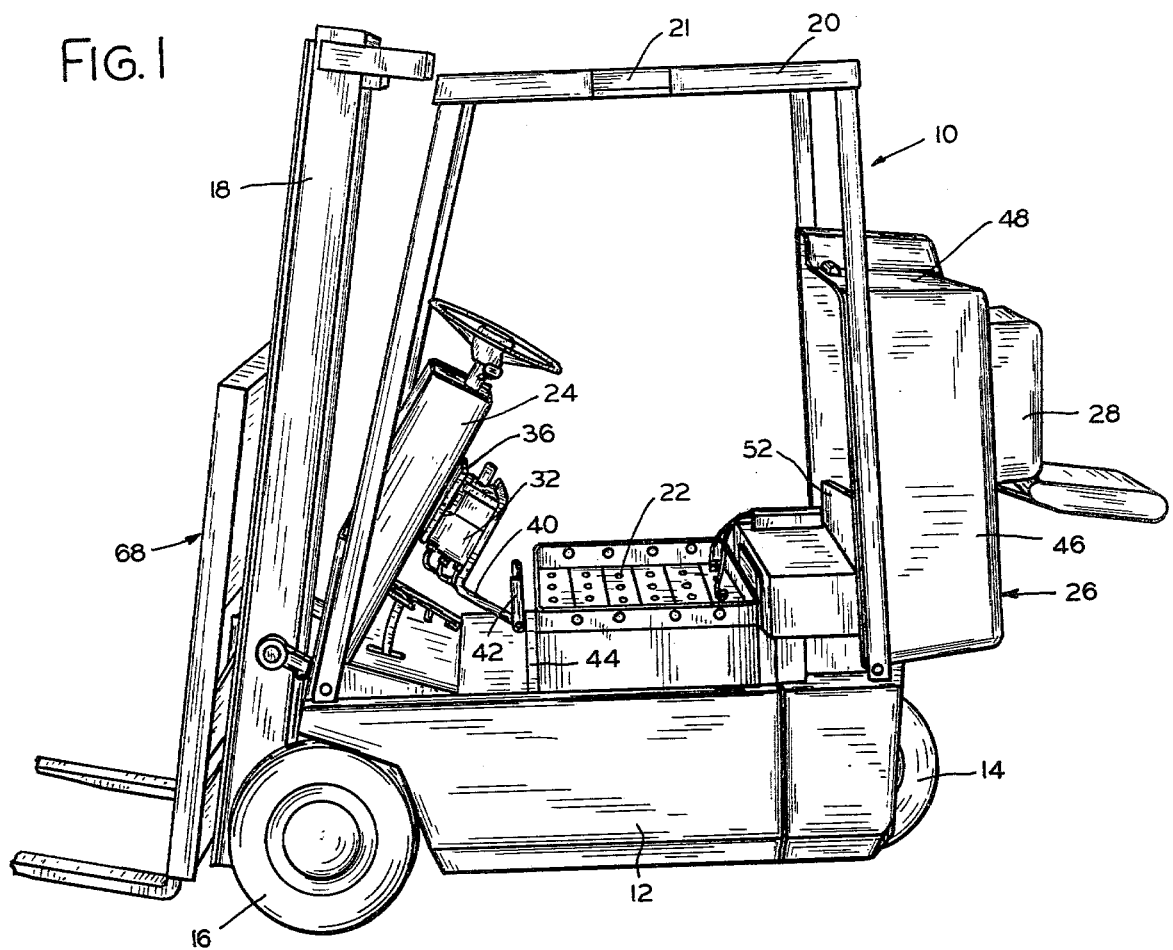
FIG. 1 is a side view in perspective of an electric lift truck showing the hood device in a rearwardly pivoted position and the valve means and mounting in a forwardly pivoted position.
Figure 2:
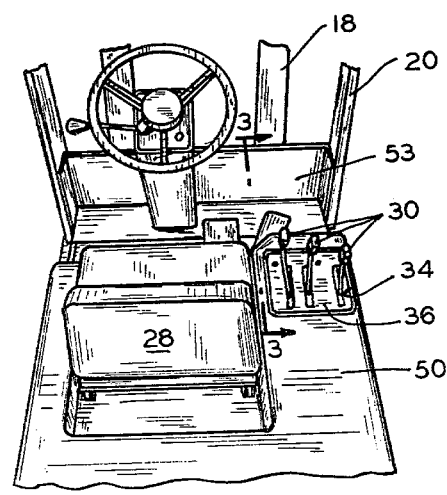
FIG. 2 is a partial view in perspective taken from the rear and above the operator's station showing the hood device and valve control in position for operating the lift truck wherein the valve control extends through an opening in the hood device.
Figure 3:
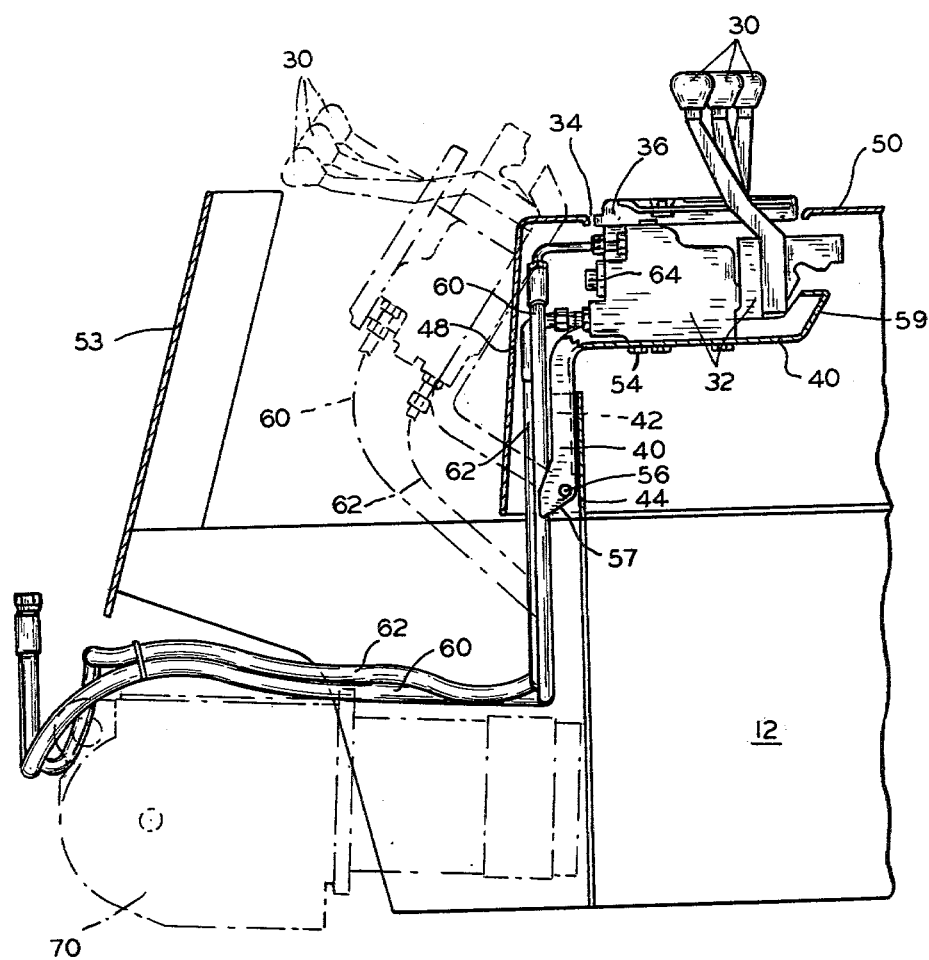
FIG. 3 is an enlarged partial side-sectional view taken along line 3—3 of FIG. 2 showing only some of the parts as would be seen in that view and wherein the valve control levers and valve block with the hood device are shown in solid lines in operative position as is also shown in FIG. 2, and the valve levers and valve block are also shown in phantom view in a forwardly pivoted position as in FIG. 1.

Referring to FIGS. 1–3, a conventional lift truck is shown at 10 having a frame and body construction 12, a single center mounted steer wheel 14 at the rear of the truck, a pair of traction wheels 16 at the forward end, an upright assembly 18, an overhead guard assembly 20 having an open slotted section 21 in the overhead grid structure thereof, a battery and drive component compartment mounted centrally of the truck including the battery 22, an operator's steering wheel and console 24, a box-like hood device 26 having mounted thereon operator's seat 28, and foot and hand operated controls including three valve control levers 30 mounted on a valve block 32 which is mounted on an angle member 40 pivotable forwardly from its operative position as viewed in FIGS. 1 and 3.

An opening 34 is formed in the right forward upper panel portion of hood 26 and is adapted to register with a plate 36 when the valve control lever and valve bank assembly is in operative position and the hood is down, as shown in FIGS. 2 and 3. Plate 36 is slotted as shown to accommodate forward and rearward movement of each of the valve levers and is suitably connected to the valve bank housing. The valve bank and control lever assembly is secured to the angle member 40 which is mounted pivotably from a bracket 42 which extends in front of and is secured to a transverse truck body plate 44 located in front of the battery compartment which houses batteries 22.

The overhead guard is secured at the front and rear of the truck on pairs of supporting legs in known manner. The box-shaped hood 26 comprises a pair of longitudinally extending upright and parallel plate members 46, a front transverse plate 48 connecting the longitudinal plates, and an upper plate 50 connecting the side and front plates, the operator's seat being mounted as shown to the upper plate. The rear of the hood is open so that it can pivot over an upper counterweight plate 52 at the rear of the truck, the rear overhead guard legs being secured to the truck and the hood being pivoted from the lower ends of the rear gaurd legs as is disclosed in detail and claimed in the co-pending application Ser. No. 075,487, filed Sept. 14, 1979, in the name of Edgar Wahnemuehl, an applicant in this present application, common assignee. A front body plate 53 extends across the truck at the front end of the operator's compartment.

The valve bank and control lever assembly 30,32, on which is mounted upper slotted plate 36, is mounted as by stud members 54 on the angle member 40 which is of U-shaped cross-section, as shown, and which is pivotable on a pin 56 mounted on bracket 42. Flexible hydraulic conduits 60 and 62 are shown connected to the valve block 32 for conveying hydraulic fluid to and from operating components, such as lift and tilt cylinders associated with the upright 18 and controlled by the valves operated by two of the control levers 30. A third control lever 30 is provided for operative connection to a third valve in the valve block and a third hydraulic conduit, not shown, which may be connected to a valve block outlet 64 and to auxiliary hydraulic equipment, for example, which may be mounted on a fork carriage 68.

When the hood 26 is raised as in FIG. 1 the valve block and control lever assembly may be pivoted, as aforesaid, to the phantom line position shown in FIG. 3 wherein flexible conduits 60 and 62 are shown with relatively small deformation so as to avoid any undue bending or kinking of the conduits. This feature is accommodated by the length of the downwardly extending leg of angle member 40 which provides a relatively long radius of swinging movement of the control and valve assembly 30,32 whereby to both limit the amount of bending required of the flexible conduits and to project the control and valve assembly forwardly out of the vertical space above battery 22 in substantially less than 90° of pivotable movement.

A stop surface 57 is formed at the lower end of the vertical leg of angle member 40 below pivot pin 56 in order to limit the pivotal movement of the valve block and control lever assembly, stop 57 engaging plate 44 when the assembly is pivoted fully forwardly. The upwardly angled end 59 of the horizontal leg of member 40 protects the connecting ends between the valve ends and valve levers during battery removal and replacement.

The drive axle and electric motor of the truck are shown in phantom lines at numeral 70 primarily to orient these drive components to the frame of the truck as shown in FIG. 3. They are shown in phantom because they would not appear in the section of FIG. 3 as taken across the right hand portion of the truck, the drive motor being normally located longitudinally centrally of the truck.

The down-turned peripheral edge of upper plate 50 of the hood which forms opening 34, as shown in FIG. 3, has only a small clearance with lever control plate 36 so that operation of the valves by valve levers 30 does not tend to move the valve assembly forwardly with angle member 40.

In operation, the battery is made fully accessible for deposit and removal by locating the hood and valve block and control lever assembly as in FIG. 1 and by disconnecting the battery cables, whereby an overhead hoist, for example, can be moved into the open transverse slot 21 of the overhead guard. It is then connected to the battery case to elevate it and move it sideways out from under the overhead guard. In some truck designs it may be also necessary to provide for a forwardly pivotable steering column or console 24. In any event, insofar as the instant invention is concerned, the design provides for an open and uninterrupted space above the battery compartment for the purpose specified.

It will be understood that within the scope of my invention there may be alternate constructions depending upon the size and height of the batteries, for example, whereby with a taller battery than is shown in FIG. 1 it may be more feasible to mount the valve block 32 in a fixed position in front of plate 44 and to mount the valve control levers above the valve block to operate the valves, pivoting only the valve control levers forwardly out of vertical interference with the battery. A slotted control plate similar to plate 36 may be used which plate may be pivoted with the levers.

Although I have described and illustrated a preferred embodiment of my invention, it will be understood by those skilled in the art that modifications may be made in the structure, form, and relative arrangement of parts without necessarily departing from the spirit and scope of the invention. Accordingly, it should be understood that I intend to cover by the appended claims all such modifications which fall within the scope of my invention.

I claim:

1. In a lift truck having an operator's station and a pivoted hood which normally covers a vehicle drive component of the truck such as a battery means and on which is mounted an operator's seat, said hood being pivotable rearwardly of the truck to a position in which said drive component is exposed, operator control means for operating one or more lift truck components supported from a position adjacent the front side of said drive component and having at least a portion thereof which normally overlies in a horizontal direction a portion of said drive component, and an opening in said hood registrable with said control means which extends upwardly through said opening for operation by the operator when said control means is in said latter position and the hood is pivoted to its normally down position, said control means being pivotable forwardly on the support thereof to a position outside the projected area of said drive component in a vertical direction when said hood is pivoted rearwardly out of registry with said control means.

2. A lift truck as claimed in claim 1 wherein said drive component is a drive battery in an electric truck, and said control means includes a plurality of hydraulic valve control levers which extend upwardly through the hood when in registry with said hood opening.

3. A lift truck as claimed in claim 1 wherein the mounting for said control means includes an angle member having an operative position in which a downwardly depending leg is mounted pivotably from the lower end portion thereof and having a substantially rearwardly horizontally extending leg on which the control means is mounted, said angle member being pivotable forwardly to an inoperative position in which the control means and horizontally disposed leg are located outside of said projected area of the drive component.

4. A lift truck as claimed in claim 1 wherein said operator control means comprises a hydraulic valve block and upwardly extending control valve levers connected thereto all supported from mounting means, said mounting means including a member extending rearwardly over a portion of said drive component wherein the control means is in operative position and pivotable forwardly of said drive component wherein said control means is in an inoperative position.

5. A lift truck as claimed in claim 4 wherein said mounting means comprises an angle member having a downwardly depending leg supported pivotably from a position below the upper surface of said drive component such that the mounting means with said control means is swingable forwardly out of the said projected area of said drive component when said hood is pivoted rearwardly out of said projected area and out of registry with said control means.

6. A lift truck as claimed in claim 1 wherein said drive component is elevatable out of its compartment in a vertical direction without interference with said hood or control means when the latter are pivoted to said inoperative positions.

7. A lift truck as claimed in claim 4 wherein a hydraulic conduit is connected to the valve block and extends downwardly and forwardly therefrom, the downward extension of said conduit being movable forwardly with said valve block to effect a non-kinking bend radius with the forwardly extending conduit portion.

8. A lift truck as claimed in claim 4 wherein the valve block is located beneath the upper panel cover of the hood and above the upper surface of the drive component, said control levers extending through said hood and above said upper panel.

9. In a sit-down rider type electric lift truck having a generally centrally located drive battery and a hood assembly having an operator's seat mounted on the top thereof pivotably connected to the truck at the rear end portion thereof adapted to cover the drive battery in operative position and pivotable rearwardly of the truck to uncover the drive battery in inoperative position, an opening in said hood, hydraulic valve control means for operating hydraulic components of the truck mounted from a position adjacent the front side of said drive battery in such a manner that the valve control means can be pivoted forwardly from a position which extends rearwardly over a portion of said drive battery to a position outside of the projected area of said drive battery in a vertical direction, said valve control means when in a retracted operative position being registrable with said hood opening.

10. A lift truck as claimed in claim 9 wherein said hydraulic control means includes hydraulic valve means and control lever means connected thereto, said valve means being located in normal position intermediate the upper surface of the hood and the upper surface of the drive battery, said lever means extending from said valve means upwardly through said hood opening for manual control by the operator.

* * * * *